United States Patent [11] 3,554,485

[72] Inventor Cecil Graham Francis Richards
  Aspley, Brisbane, Australia
[21] Appl. No. 768,314
[22] Filed Oct. 17, 1968
[45] Patented Jan. 12, 1971
[73] Assignee B. C. Richards & Co. Pty. Ltd.
  Geebung, Brisbane, Queensland, Australia
  a corporation of Queensland
[32] Priority May 29, 1968
[33] Australia
[31] No. 38523/68

[54] SEALING ASSEMBLIES FOR ROTARY BALL VALVES
1 Claim, 1 Drawing Fig.
[52] U.S. Cl. .................................................. 251/172, 251/174
[51] Int. Cl. .................................................. F16k 5/20
[50] Field of Search............................................ 251/174, 315, 172

[56] References Cited
UNITED STATES PATENTS
2,973,182 2/1961 Gill.............................. 251/174
3,235,226 2/1966 Allen........................... 251/315X
3,241,808 3/1966 Allen........................... 251/174
3,275,025 9/1966 Kowalski...................... 251/174X
3,315,697 4/1967 Oliver.......................... 251/174X
3,346,234 10/1967 Allen........................... 251/174

Primary Examiner—M. Cary Nelson
Assistant Examiner—Michael O. Sturm
Attorney—Oberlin, Maky, Donnelly & Renner ABSTRACT: A sealing assembly for a ball valve includes in succession a seat ring, a retaining ring and a backing ring exerting pressure on said retaining ring, in which a wedge ring contacts said retaining ring on its outer conical surface and said backing ring presses only on the rear surface of said wedge ring and not directly on said retaining ring.

3,554,485
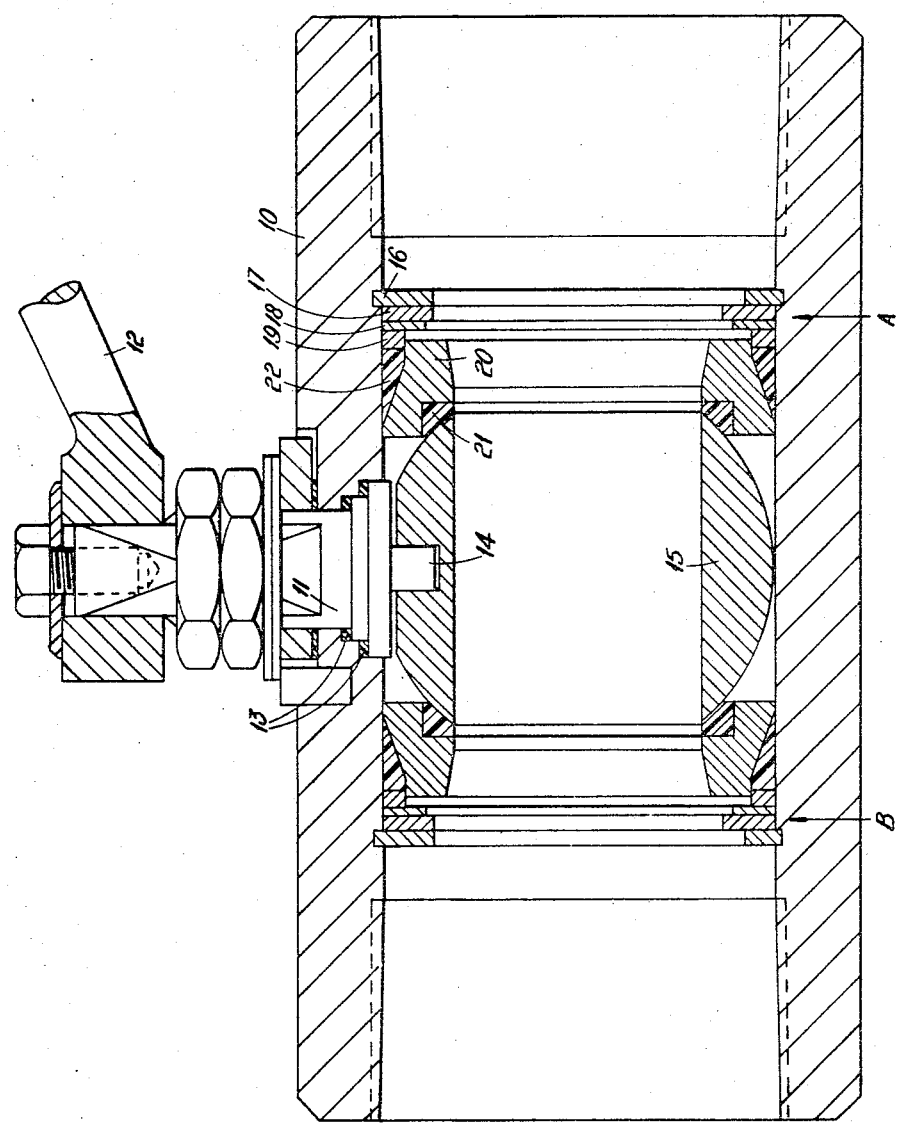

SEALING ASSEMBLIES FOR ROTARY BALL VALVES

This invention relates to sealing assemblies for rotary ball valves.

These assemblies primarily contact the ball around the inlet and outlet of the fluid-flow aperture in the ball to seal against the ball surface and prevent leakage from the fluid ways into the spaces external to the ball.

The assembly is mounted in a fluid passage in the valve body and the assembly must also provide an adequate radial seal against the inside surface of the body to prevent leakage from said passage to the spaces external to the ball.

It is an object of this invention to accomplish this dual sealing in a simple and effective manner.

In order that the invention may be better understood, a particular embodiment will be described with reference to the accompanying drawing, which shows in section a ball valve using sealing assemblies according o to the invention.

The ball valve shown is of the general type described in our previous Australian Pat. application No. 22539/67, but, of course, substituting the new sealing assembly for that previously described.

In the drawing, wherein like reference characters are used throughout to designate like parts:

FIG. 1 is a longitudinal sectional view of a rotary ball valve constructed in accordance with the present invention, with the valve member thereof in its open position.

Valve body 10 comprises a single length of heavy tube, apertured radially to receive ball-actuating spindle 11 turned by handle 12 and sealed against leakage by washers 13 in compression. Spindle 11 has a diametral rib 14 engaging in a slot in the top of ball 15. Body 10 has internal grooves into which circlips 16 are inserted to hold the sealing assemblies A and B against ball 15.

Both sealing assemblies A and B are identical and each consist of a retaining washer 17, a compression ring 18, a backing ring 19, a seat-retaining ring 20 (all of stainless steel), a seat ring 21 and a wedge ring 22 (both preferably of Polytetrafluorethylene, PTFE).

Compression ring 18 takes the form of a flat spring, and therefore, when the assembly is compressed between circlip 16 and ball 15, exerts pressure on backing ring 19.

The radial width of ring 19 is equal to or slightly less than the radial dimension of the rear face of ring 22. Ring 19 exerts pressure, therefore, only on ring 22 and not directly on ring 20.

Ring 22 is thus urged towards the ball, and wedges against ring 20 to urge it also towards the ball and press seat ring 21 into good sealing engagement with the ball surface. As the pressure of seat ring 21 on ball 15 increases, wedge ring 22 wedges more tightly between the sloped outer surface of ring 20 and the inner surface of body 10 to give a tight compression seal at its periphery and against ring 20.

The combination of the wedge-shaped cross section of ring 22, with the means for exerting force only on it, and not on ring 20, therefore gives effective sealing between ring 21 and the ball and also peripherally of the assembly. The ball seal and the peripheral seal are, moreover dependent on one another.

With little pressure on ball 15, there is little wedging pressure, but, with increase of pressure on ball 15, there is an increase of peripheral sealing pressure and sa sealing pressure between rings 22 and 20.

Owing to this dependence the sealing assembly moves easily and does not stick, and is easily disassembled when pressure on it is relaxed.

It will be seen that the outer face of ring 20 is made cylindrical for a short distance at the rear to enable backing ring 19 to move freely some distance over it, so that pressure on ring 22 may be maintained in spite of wear of seat ring 21 or slight movement of ball 15 under fluid pressure.

In some valves, the seat ring 21 is of accurately shaped metal instead of PTFE or other plastic. In such a case, rings 20, 21 may be made integrally. Similarly, in some cases, it may be possible to make rings 20, 21 integrally of PTFE or similar material.

Various other changes may be made in the assembly described, as long as such assemblies include the wedge contact between rings 20, 22 and means for exerting pressure only on ring 22.

I claim:

1. A rotary ball valve comprising a continuous tubular body which has a constant inner and outer diameter, an apertured ball in said body, and sealing assemblies for said ball, which assemblies include a seat ring to seal against the surface of the ball, a seat-retaining ring supporting said seat ring and having both a conical outer surface sloping outwards toward said ball and a cylindrical extension to the rear thereof, a wedge ring having a conical inner surface contacting said outer surface of said seat-retaining ring and a substantially radial rear face, a backing ring of such radial dimension that it abuts only said rear face of said wedge ring, said backing ring lying around said cylindrical extension, spring means for exerting pressure on said backing ring to press it against said wedge ring, and internal circlips within said body against which the spring means react to hold said assemblies against said ball.